No. 619,420. Patented Feb. 14, 1899.
H. IRVING.
MECHANICAL MOVEMENT.
(Application filed Aug. 31, 1898.)
(No Model.) 3 Sheets—Sheet 1.
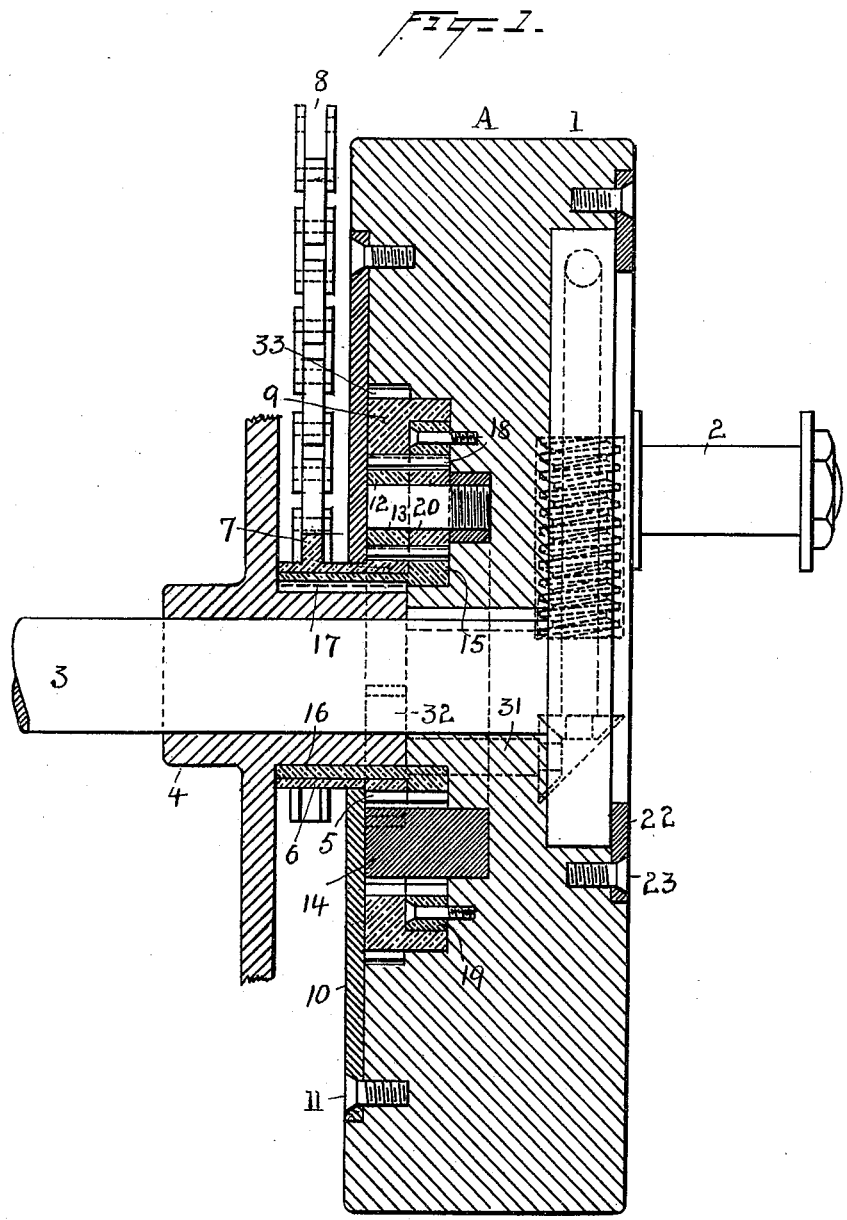

No. 619,420. Patented Feb. 14, 1899.
H. IRVING.
MECHANICAL MOVEMENT.
(Application filed Aug. 31, 1898.)
(No Model.) 3 Sheets—Sheet 2.
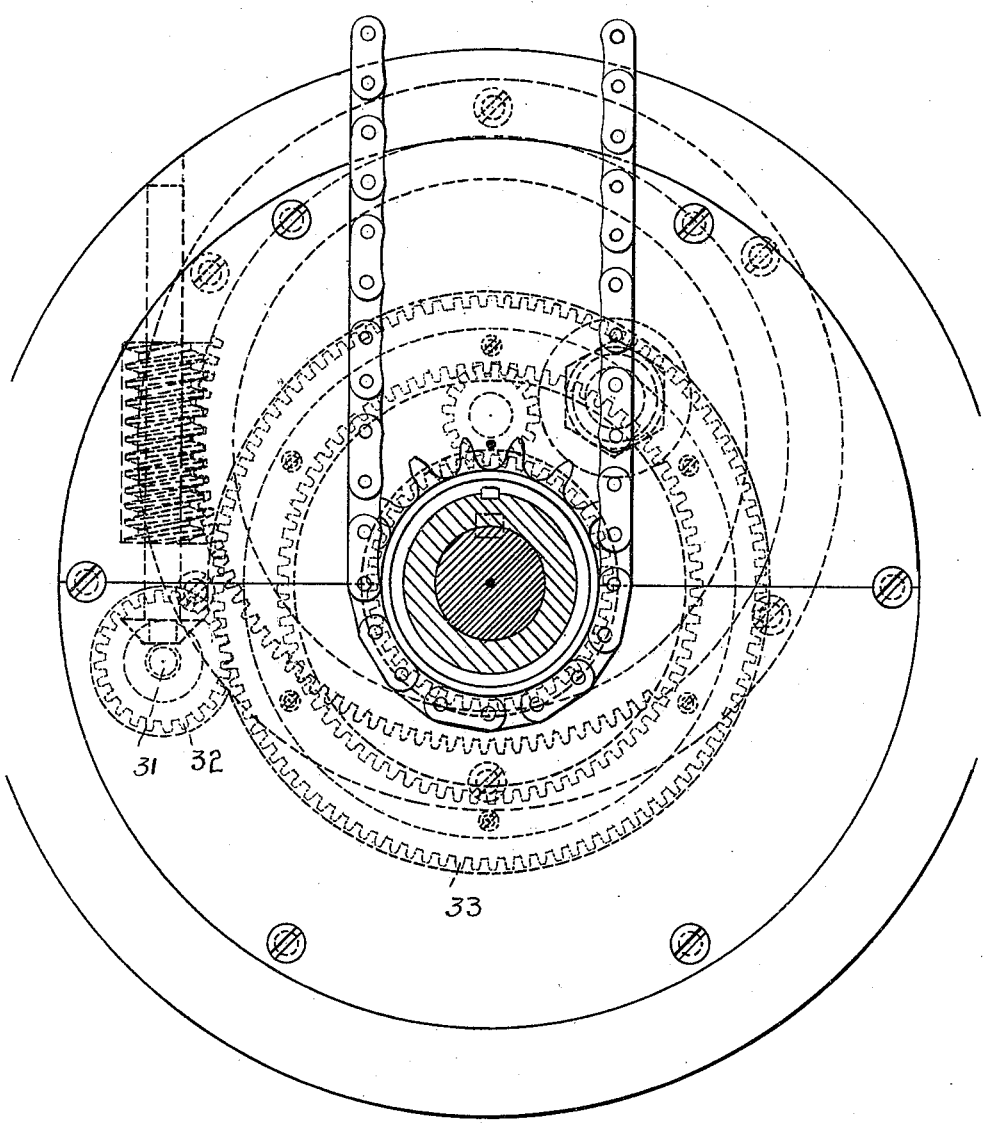

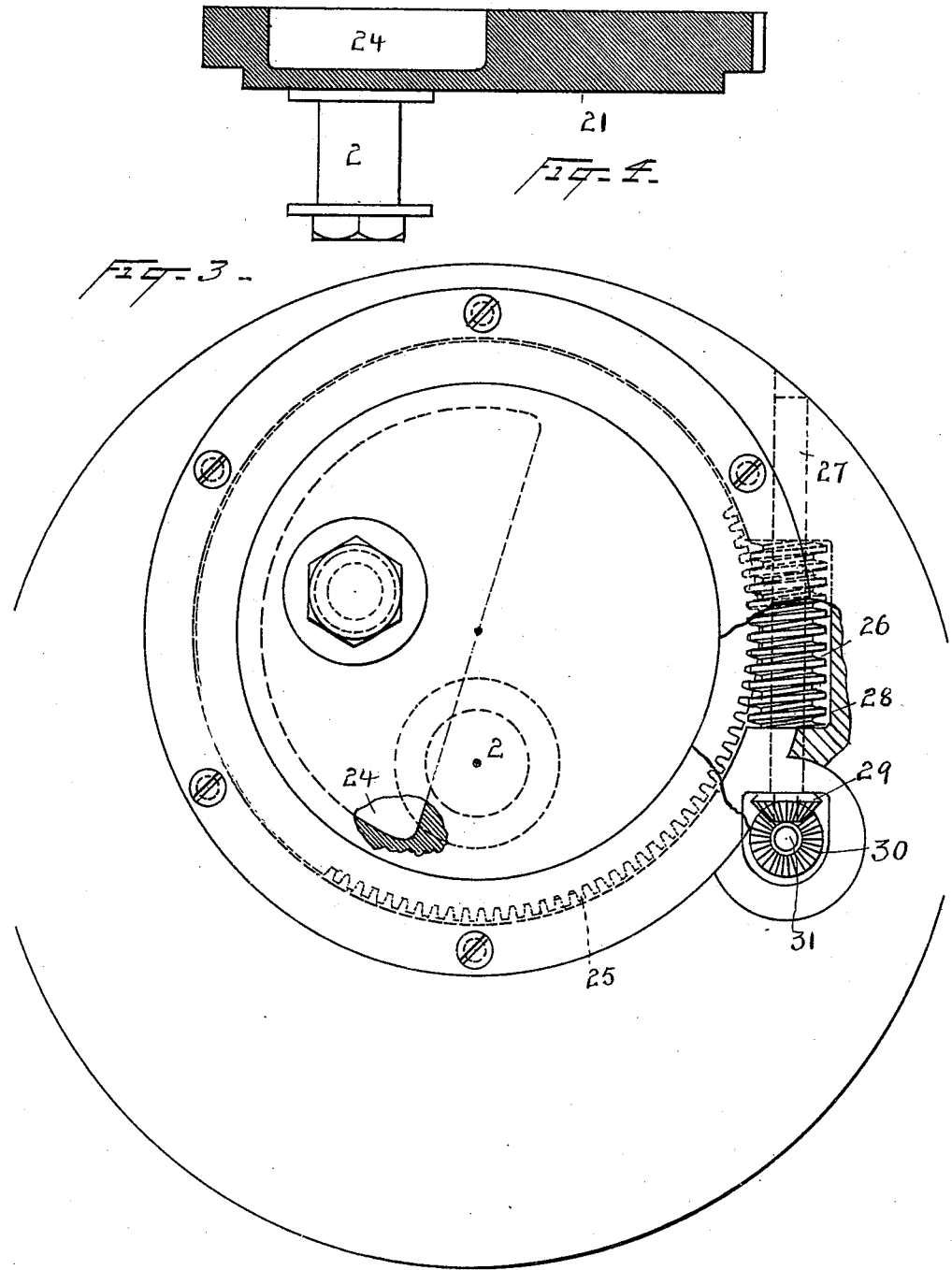

UNITED STATES PATENT OFFICE.

HENRY IRVING, OF NEW YORK, N. Y.

MECHANICAL MOVEMENT.

SPECIFICATION forming part of Letters Patent No. 619,420, dated February 14, 1899.

Application filed August 31, 1898. Serial No. 689,931. (No model.)

*To all whom it may concern:*

Be it known that I, HENRY IRVING, a citizen of the United States, residing in the borough of the Bronx, city and State of New York, have invented certain new and useful Improved Mechanical Movements, of which the following is a specification.

My invention relates to various new and useful improvements in mechanical movements.

My improved mechanical movement is designed for the purpose of providing substantially diametrical movement of a device carried on a rotating or rotatable part.

An illustration of one use to which the invention may be applied is a fly-wheel or a driven belt-wheel partaking of rotary movement and carrying a crank-pin which it is designed should be moved toward or away from the center of the fly-wheel or belt-wheel. By thus regulating the distance between the crank-pin and the center of the fly-wheel or belt-wheel the throw or stroke of a pitman or other element connected to the crank-pin can be correspondingly varied for any suitable purpose—such, for example, as the rotation of a driven element at a variable and determined speed. In the class of devices thus given as an illustration, to which my present invention may be applied, I may mention a gas or explosive engine the fly-wheel of which is provided with a crank-pin movable toward or away from the center of the fly-wheel, whereby by changing the throw of a pitman connected with the crank-pin by altering the position of said crank-pin, the gas or explosive engine operating at an approximately constant speed may rotate a moving element, such as the wheel of a vehicle, at any desired speed.

So far as I am aware I am the first to suggest a positive gearing by which a device carried by a rotating part may be moved diametrically with respect to such rotating part and independent of its rotation.

In carrying out my invention I provide, in combination with a rotating part and a device rotating therewith, but movable diametrically with respect to the same, a normally stationary abutment or anchor gear either internally or externally toothed, or a friction-gear without teeth or the equivalent thereof; a second gear normally movable with the rotating part and having interior or exterior teeth or being a friction toothless gear or the equivalent thereof, the said second gear having any suitable connections with the device which is to be moved diametrically, whereby when the second gear is moved relatively to the rotating part the said device will be moved diametrically with respect to the rotating part either toward or from the axial center thereof; means interposed between the normally stationary abutment or anchor gear and the second gear referred to, by which upon the movement of the abutment or anchor gear the second gear will be moved or allowed to be moved relatively to the rotating part, so as to change the position of the adjustable device; other means of any type for causing the intermediate means between the abutment or anchor gear and the second gear to partake of movement with respect to the abutment or anchor gear, the second gear, and the rotating part, whereby a moving fulcrum for the intermediate means will be secured, and, finally, any desired adjusting mechanism for moving the said anchor or normally stationary gear when it is desired to change the relative position of the adjustable device with respect to the axial center of the rotating part. With such device when the rotating part is rotated and the abutment or anchor gear is maintained stationary the second gear will rotate with the rotating part, the intermediate means between the abutment or anchor gear and the second gear allowing for this rotation without substantial friction owing to the movable fulcrum of such intermediate means. When, however, the anchor or abutment gear is moved in one direction or the other and to any desired extent, the intermediate means between the same and the second gear will cause said second gear to move relatively to the rotating part without, however, affecting the rotation of such part, this movement being possible by reason of the moving fulcrum of such intermediate means, and the relative movement of the second gear will, through the suitable connections, move the adjustable device toward or away from the axial center of the rotating part and to the desired extent of movement.

In the accompanying drawings I have shown as one illustration of my invention a fly-wheel, such as the fly-wheel of a gas or explosive engine, having a crank-pin which is movable toward and away from the axial center of the fly-wheel, so as to vary the stroke of a pitman connected to said crank-pin and to thereby operate a driven element at a variable speed.

In the drawings I also illustrate one form of mechanism for carrying my invention into effect. It is possible, however, to use my invention in other arts and to carry the same into effect by widely different mechanisms, and I therefore do not wish to be limited either to the use to which the invention is applied or to the mechanisms shown for carrying the invention into effect.

In the drawings I also illustrate various details of construction, which will be made the subject of specific claims.

Referring to the drawings, Figure 1 is a sectional view through a fly-wheel, illustrating an approved mechanism for carrying my invention into effect; Fig. 2, a sectional view taken through the shaft and journal-box, illustrating many of the parts in dotted lines; Fig. 3, a face view of the fly-wheel, partly in section; and Fig. 4, a sectional view illustrating the preferred mechanism for carrying the crank-pin.

In all of the above views corresponding elements are represented by the same numerals of reference.

1 represents the rotating part, which in this instance is a fly-wheel, such as the fly-wheel of a gas or explosive engine. It may, however, be a driven belt-wheel or any other rotating part.

2 is the device to be moved diametrically, which in this instance is a crank-pin, which does any work desired. It may, however, be any device which it is desired should be moved diametrically with respect to a rotating part, such as a cutter in a woodworking device. The rotating part 1 is mounted on a shaft 3, carried in a journal-box 4. The rotating part 1 may be keyed to said shaft or be loosely mounted thereon.

5 is a normally stationary but movable abutment or anchor gear, which is shown as being carried on a sleeve 6. The abutment or anchor gear illustrated is an externally-toothed gear; but it may be internally toothed, or it may be a toothless friction-gear or the equivalent thereof. Although the anchor or abutment gear 5 is normally stationary, it is adapted to be moved when it is desired to move the device 2 diametrically with respect to the rotating part 1. This can be effected in any suitable way. I illustrate, as an example, the sprocket-wheel 7 on the sleeve 6, adapted to be rotated by a sprocket-chain 8 so as to turn the abutment or anchor gear 5. 9 is a second gear, which normally rotates with the rotating part 1. This gear is illustrated as being an internally-toothed gear; but it may obviously be externally toothed or be a toothless friction-gear or the equivalent thereof. I illustrate the second gear 9 as being of larger diameter than the abutment-gear 5; but obviously these proportions may be reversed, and the abutment-gear may inclose the second gear or made in any proportion, as the two gears may be spur or internal at the same time. The teeth of the gears 5 and 9 are arranged in line, and the said gears are preferably carried within the face of the rotating part 1—as, for example, behind a plate 10, secured to said rotating part by the screws 11. Any intermediate mechanism is interposed between the abutment-gear 5 and the second gear 9, so long as such intermediate mechanism is of such a character as will permit or force the gear 9 to rotate normally with the rotating part 1, but to be moved relatively with respect to such rotating part when the abutment or anchor gear 5 is moved. As an illustration of an intermediate mechanism which may be employed I have shown a pinion 12, loosely mounted on a pin or stub shaft 13, said pinion engaging the teeth of the gears 5 and 9. It will be observed that if the gear 9 rotates with the rotating part 1 the intermediate gear 12 will not only rotate on the pin 13, but will also partake of revolution with respect to the abutment-gear 5 like a planet-gear. It therefore is necessary to provide for this revolution of the intermediate gear 12 or other means connecting the abutment or anchor gear and the second gear. For this purpose I have illustrated the pin or stub shaft 13 as being carried in an annular ring 14, which rotates within the rotating part 1 and with respect to the same. It will thus be noted that in the rotation of the part 1 the annular ring 14 or other device, which carries the intermediate means between the anchor or abutment gear and the second gear, will partake of rotation at a relative but different speed with respect to the speed of rotation of the part 1. For this reason the positive connection between the gears 5 and 9 will not affect the rotation of the part 1. In order that the second gear 9 may be positively moved with respect to the rotating part 1, while at the same time the said second gear is rotating with said part, it is necessary that the intermediate mechanism should be positively carried with the rotating part at a generally different though relative speed, the speed with which the said intermediate mechanism is thus normally carried being such as will normally allow the gear 9 to rotate with the part 1 at the same speed as that part, while the abutment or anchor gear 5 is maintained stationary. In other words, it is necessary to provide a moving fulcrum for the mechanism between the abutment-gear 5 and the second gear 9, or in the specific mechanism shown it is necessary to positively move the intermediate gear 12 with respect to the other gears and the rotating part at such a relative speed as will allow the second gear 9 to rotate with the part 1. I illustrate mechanical connections by means of which this may be done; but it will be understood that many other mechanical connections can be used for accomplishing this result.

Referring to the specific mechanism shown, 15 represents a gear which is illustrated as being located at the side of the abutment-gear 5 within the rotating part 1, such gear in this instance being of the same size and having the same number of teeth as said abutment-gear. The gear 15 is carried on a sleeve 16, on which the sleeve 6 turns, said sleeve 16 being secured to the journal-box 4 by a key 17, whereby the gear 15 will be always maintained stationary.

18 represents an internally-toothed gear located at the side of the gear 9 and of the same size and number of teeth. The internally-toothed gear 18 is secured to the fly-wheel 1 by screws 19, whereby said internally-toothed gear 18 always partakes of the same rotation as the part 1.

Interposed between the gears 15 and 18 is a pinion 20, carried on the pin or stub shaft 13 at the side of the pinion 12, of the same number of teeth in this instance as said pinion and meshing with the teeth of the said gears 15 and 18. It will be understood that the gears 15 and 18 may be reversed, the former being carried by the rotating part and the latter being maintained always stationary, and that the said gears may be toothless friction-gears or the equivalent thereof.

In the specific illustration of my invention which I have so far described it will be evident that by rotating the rotating part 1, carrying the internally-toothed gear 18 with it, the pinion 20 will roll upon the gear 15 like a planet-gear, carrying in this instance the pin or stub shaft 13 in its revolution at a slower but relative speed with respect to the rotation of the part 1. Obviously the speed of revolution of the pin or stub shaft 13 will be such as will permit the pinion 12 to roll upon the abutment or anchor gear 5 and carry the second gear 9, without cramping or binding, at the same speed as that of the gear 18, and consequently of the rotating part 1. The gears 15, 18, and 20, therefore, constitute a means for causing the fulcrum of the intermediate gear 12 or other device to be revolved at the proper speed to allow the abutment-gear 5 to be normally stationary and the second gear 9 to rotate with the part 1. If, now, the abutment or anchor gear 5 is rotated in any direction and to the desired extent, it will be seen that through the intermediate mechanism, such as the pinion 12, the second gear 9 will be moved relatively to the part 1, so that the said second gear will partake of a slightly-different speed from that of the part 1, either in excess or below that speed. In other words, the same effect will be produced while all the parts are rotating that would be produced if the part 1 and gear 9 were stationary and if the abutment-gear were moved, in which case the gear 9 would be moved with respect to the part 1 in the desired direction and to the desired extent.

Having obtained a mechanism of any desired type, of which that illustrated is an approved example and by which while the part 1 is rotated the gear 9 or an equivalent device may be moved relatively to said rotating part, it is possible by many different forms of mechanism to communicate the movement of the gear 9 relatively to the part 1 to the device 2, which is to be moved diametrically with respect to the part 1. In the drawings I illustrate an approved connection which can be employed for effecting this result, and I also illustrate an improved manner of mounting the device 2, whereby the latter can be moved diametrically with respect to the part 1, and for so balancing the parts that the movement of the device 2 toward and away from the axial center of the part 1 will not result in an overbalance. To this end the device 2, which in the specific instance illustrated is a crank-pin, may be carried on a disk 21, which is fitted in a circular recess in the outside of the rotating part 1, being held in place by an annular ring 22, secured to the part 1 by the machine-bolts 23. The disk 21 is located eccentrically to the axis of the part 1 and carries the device 2 near its periphery, whereby when the disk is rotated the device 2 may be moved toward and away from the axial center of the part 1. Preferably the disk 21 is so located that the device 2 may be moved to the position shown in dotted lines, Fig. 3, so as to occupy a position coincident with the axial center of the part 1, whereby when in this position the said device 2 will rotate at a fixed point and will communicate no movement to the pitman or other element with which it is connected. The rotating part 1 is so formed as to exactly counterbalance the disk 21, carried thereby. In order that the movement of the device 2, carried by said disk, may not change this balance, I prefer to counterbalance the disk, so that it will be always balanced with respect to its own axis. The most effective way of doing this is to remove a portion 24 of said disk equal in weight to the device 2, so that if the said disk were supported on an axis it would remain in equilibrium at all points. By thus counterbalancing the disk 21 with respect to its own axis and by counterbalancing the part 1 it will be observed that the disk may be moved to any position of its rotation without affecting the balance of the device, and there will be no unbalanced centrifugal forces developed tending to rotate the disk. It will be understood that instead of removing a portion of the disk to offset the weight of the device 2 a counterweight can be added to said disk diametrically opposite to the point of connection of the device 2 and by which the said device will be counterbalanced.

The disk 21 is rotated by the relative movement of the gear 9 with respect to the part 1 by any suitable connections. In the drawings I illustrate the said disk as being provided with teeth 25, which extend around a portion of its periphery equal to the desired extent of movement of said disk and mesh with said teeth a worm 26, which is carried on a shaft 27, the worm working in a recess 28, formed in the part 1. I also illustrate the worm-shaft 27 as being provided with a bevel-pinion 29, driven by a similar pinion 30 on a shaft 31, which extends through the part 1 parallel with its axis. The shaft 31 is illustrated as carrying a pinion 32, keyed to its inner end, which pinion meshes with teeth 33, formed on the outside of the gear 9, as shown particularly in dotted lines, Fig. 2.

With connecting mechanism between the gear 9 or its equivalent and the device 2 such as I have explained and which is of an approved type, although manifestly any mechanism may be employed for the same purpose, and by mounting the device 2 on a rotatable disk as I have described it will be seen that when the gear 9 is moved relatively to the rotating part 1 it will rotate the pinion 32 and shaft 31 and through the intermediate gears 29 and 30 will drive the worm-shaft 27 to cause the worm 26 to rotate, the disk 21 thereby carrying the device 2 toward or away from the axial center of the rotating part 1, the extent of that movement depending upon the extent of movement of the gear 9 relatively to the rotating part 1, which in turn depends upon the extent of movement to which the abutment or anchor gear 5 was subjected. It will of course be understood that instead of making use of a single intermediate device, such as the pinion 12 between the abutment or anchor gear and the second gear 9, a plurality of such devices may be used, so as to more equally distribute the strains imposed in the operation of the gear 9 relatively to the moving part 1.

Having now described my invention, what I claim as new, and desire to secure by Letters Patent, is as follows:

1. In a mechanical movement, the combination of a normally stationary abutment or anchor gear, means for rotating said gear in either direction, a second gear coöperating with said abutment or anchor gear, and an intermediate mechanism between said gears positively carried revolubly with respect to the abutment or anchor gear, and normally rotating the second gear at a relative speed with respect to the revolution of the intermediate mechanism, whereby upon rotating the abutment or anchor gear the second gear will be rotated at a different relative speed from the revolution of the intermediate mechanism, substantially as set forth.

2. In a mechanical movement, the combination of a normally stationary abutment or anchor gear, means for rotating said gear in either direction, a second gear coöperating with said abutment or anchor gear, and a pinion connecting the gears and positively carried revolubly with respect to the abutment or anchor gear, and normally rotating the second gear at a relative speed with respect to the revolution of the pinion, whereby upon rotating the abutment or anchor gear the second gear will be rotated at a different relative speed from the revolution of the pinion, substantially as set forth.

3. In a mechanical movement, the combination with a rotating part and a device carried thereby and movable toward and away from the axial center thereof, of a normally stationary abutment or anchor gear, means for rotating said gear in either direction and to any desired extent, and connections between said abutment or anchor gear and said device for moving the latter toward and away from the axial center of the rotating part while the latter is rotating, substantially as set forth.

4. In a mechanical movement, the combination with a rotating part and a device carried thereby and movable toward and away from the axial center thereof, of a normally stationary abutment or anchor gear concentric with the axis of said rotating part, means for rotating said gear in either direction and to any desired extent, and connections between said abutment or anchor gear and said device for moving the latter toward and away from the axial center of the rotating part while the latter is rotating, substantially as set forth.

5. In a mechanical movement, the combination with a rotating part and a device carried thereby and movable toward and away from the axial center thereof, of a normally stationary abutment or anchor gear, means for rotating said abutment or anchor gear, a second gear coöperating with said abutment or anchor gear, intermediate mechanism between said abutment or anchor gear and the second gear, by which upon the rotation of said abutment or anchor gear the second gear may partake of movement relatively to the rotating part while the latter is rotating, and connections between the second gear and the device to be moved toward and away from the axial center of the rotating part, substantially as set forth.

6. In a mechanical movement, the combination with a rotating part and a device carried thereby and movable toward and away from the axial center thereof, of a normally stationary abutment or anchor gear, means for rotating said abutment or anchor gear, a second gear coöperating with said abutment or anchor gear, a pinion mounted between the abutment or anchor gear and said second gear and meshing therewith, by which upon the rotation of said abutment or anchor gear the second gear may partake of movement relatively to the rotating part while the latter is rotating, and connections between the second gear and the device to be moved toward and away from the axial center of the rotating part, substantially as set forth.

7. In a mechanical movement, the combination with a rotating part and a device carried thereby and movable toward and away from the axial center thereof, of a normally stationary abutment or anchor gear, means for rotating said gear, a second gear movable relatively to the abutment or anchor gear, intermediate mechanism between the abutment or anchor gear and the second gear, means for positively carrying the intermediate mechanism relatively to the rotating part, and connections between the second gear and the device to be moved toward and away from the axial center of the rotating part, substantially as set forth.

8. In a mechanical movement, the combination with a rotating part and a device carried thereby and movable toward and away from the axial center thereof, of a normally stationary abutment or anchor gear, means for rotating the same, a second gear movable relatively to the anchor-gear, a pinion mounted between the abutment-gear and the second gear and meshing therewith, means for positively revolving said pinion with respect to the gears, and a connection between the second gear and the device to be moved toward and away from the axial center of the rotating part, substantially as set forth.

9. In a mechanical movement, the combination with a rotating part and a device carried thereby and movable toward and away from the axial center thereof, of a normally stationary abutment or anchor gear, means for rotating the same, a second gear surrounding the anchor-gear, gearing interposed between the anchor-gear and the second gear, means for positively revolving said gearing with respect to the other gears, and connections between the second gear and the device to be moved toward and away from the axial center of the rotating part, substantially as set forth.

10. In a mechanical movement, the combination with a rotating part and a device carried thereby and movable toward and away from the axial center thereof, of a normally stationary abutment or anchor gear, means for rotating the same, a second gear, a pinion connecting the anchor-gear and the second gear, a stub-shaft on which said pinion is mounted, an annular ring carrying said stub-shaft, means for positively revolving the pinion with respect to the other gears, and connections between the second gear and the device to be moved toward and away from the axial center of the rotating part, substantially as set forth.

11. In a mechanical movement, the combination with a rotating part and a device carried thereby and movable toward and away from the axial center thereof, of a normally stationary abutment or anchor gear, a second gear surrounding the abutment or anchor gear, a pinion connecting said gears, a stub-shaft on which said pinion is mounted, a permanently stationary gear, a gear permanently connected to the rotating part, a pinion on said stub-shaft connecting the stationary gear and the gear connected with the rotating part, and connections between the second gear and the device to be moved toward and away from the axial center of the rotating part, substantially as set forth.

12. In a mechanical movement, the combination with a rotating part and a device carried thereby and movable toward and away from the axial center thereof, of a normally stationary abutment or anchor gear, means for rotating the same, a second gear surrounding the anchor-gear moving normally with the moving part but movable relatively to the same, a pinion connecting the anchor-gear and the second gear, a stub-shaft on which said pinion is mounted, a permanently-fixed gear, a gear permanently connected to the moving part, a pinion meshing with the last two mentioned gears, an annular ring movable with respect to the rotating part and carrying said stub-shaft and connections between the second gear and the device to be moved toward and away from the axial center of the rotating part, substantially as set forth.

13. In a mechanical movement, the combination with a rotating part, and a disk eccentrically mounted on said rotating part and carrying a device to be moved toward or away from the axial center of said rotating part, of gearing for rotating said disk independent of the rotation of the rotating part, substantially as set forth.

14. In a mechanical movement, the combination with a rotating part and a disk eccentrically mounted on said rotating part and carrying a device to be moved toward or away from the axial center of said rotating part, of gearing for rotating said disk while the rotating part is in motion and independent of the rotation thereof, substantially as set forth.

15. In a mechanical movement, the combination with a rotating part and a disk eccentrically mounted on said rotating part and carrying a device to be moved toward or away from the axial center of said rotating part, of a normally stationary abutment-gear, means for rotating said gear, and connections between said abutment-gear and said disk by which the latter may be rotated while the rotating part is in motion, substantially as set forth.

16. In a mechanical movement, the combination with a rotating part and a disk eccentrically mounted on said rotating part and carrying a device to be moved toward or away from the axial center of said rotating part, of a normally stationary abutment or anchor gear, means for rotating the same, a second gear, connections between the second gear and said disk, and connections between the second gear and the abutment-gear, substantially as set forth.

17. In a mechanical movement, the combination with a rotating part and a disk eccentrically mounted on said rotating part and carrying a device to be moved toward or away from the axial center of said rotating part, of a normally stationary abutment or anchor gear, a second gear, connections between the second gear and said disk, intermediate mechanism between the abutment-gear and the second gear, and means for positively revolving said intermediate mechanism with respect to said gears, substantially as set forth.

18. In a mechanical movement, the combination with a rotating part and a disk eccentrically mounted on said rotating part and carrying a device to be moved toward or away from the axial center of said rotating part, of a normally stationary abutment or anchor gear, a second gear, a pinion mounted between said gears, connections between the second gear and said disk, and means for positively revolving said pinion with respect to the gears, substantially as set forth.

19. In a mechanical movement, the combination with a rotating part and a disk eccentrically mounted on said rotating part and carrying a device to be moved toward or away from the axial center of said rotating part, of a normally stationary abutment or anchor gear, a second gear, connections between the second gear and said disk, a pinion mounted between the abutment-gear and the second gear, a stub-shaft on which said pinion is carried, said stub-shaft being movable relatively to the gears and rotating part, a permanently-fixed gear, a gear connected to the rotating part, and a pinion on said stub-shaft connecting the last two mentioned gears, substantially as set forth.

20. In a mechanical movement, the combination with a fly-wheel and a crank-pin carried by said fly-wheel and movable toward and away from the axial center thereof, of a normally stationary abutment-gear, means for rotating said gear and connections between said abutment-gear and the crank-pin for moving the latter toward or away from the axial center of the fly-wheel while the latter is rotating, substantially as set forth.

21. In a mechanical movement, the combination with a fly-wheel and a crank-pin carried by said fly-wheel and movable toward and away from the axial center thereof, of a normally stationary abutment-gear, means for rotating the same, a second gear, connections between the second gear and said crank-pin, intermediate connections between the abutment-gear and second gear, and means for positively revolving said intermediate connections with respect to the gears, substantially as set forth.

22. In a mechanical movement, the combination with a fly-wheel and a crank-pin carried by said fly-wheel and movable toward and away from the axial center thereof, of a normally stationary abutment or anchor-gear, a second gear, connections between the second gear and said crank-pin, a pinion mounted between the two gears, and means for positively revolving the pinion with respect to the gears, substantially as set forth.

23. In a mechanical movement, the combination with a fly-wheel and a crank-pin carried by said fly-wheel and movable toward and away from the axial center thereof, of an abutment or anchor gear, means for rotating the same, a second gear, connections between the second gear and the crank-pin, a pinion mounted between the abutment-gear and the second gear, a stub-shaft on which said pinion is carried, said stub-shaft being movable relatively to the fly-wheel, a permanently-fixed gear, a gear attached to said fly-wheel, and a pinion on said stub-shaft connecting the permanent gear and the gear attached to said fly-wheel, substantially as set forth.

24. The combination with a fly-wheel, of a disk eccentrically mounted thereon, a crank-pin connected to said disk and arranged so as to be brought into coincidence with the axial line of the fly-wheel by the rotation of said disk, and gearing for rotating said disk while the fly-wheel is in motion, substantially as set forth.

25. The combination with a rotatable part, of a disk eccentrically mounted thereon, a device connected with said disk, and means for counterbalancing said device with respect to the axial center of the disk, substantially as set forth.

26. The combination with a fly-wheel, of a disk eccentrically mounted thereon, a crank-pin connected to said disk, and means for counterbalancing the crank-pin, substantially as set forth.

27. The combination with a fly-wheel, of a disk eccentrically mounted thereon, said disk having a recessed portion, and a crank-pin connected to said disk above said recessed portion, substantially as set forth.

This specification signed and witnessed this 27th day of August, 1898.

HENRY IRVING.

Witnesses:
JNO. R. TAYLOR,
ARCHIE G. REESE.